United States Patent [19]

Pearce et al.

[11] Patent Number: 5,634,132
[45] Date of Patent: May 27, 1997

[54] OPERATING SYSTEM INDEPENDENT SUPPORT FOR MIXED VOLTAGE DEVICES

[76] Inventors: John J. Pearce, 13413 Three Island Rd., Del Valle, Tex. 78617; Leslie Thompson, 13245 Kerrville Folkway, Austin, Tex. 78729

[21] Appl. No.: 493,889

[22] Filed: Jun. 23, 1995

[51] Int. Cl.[6] ............................................. G06F 13/00
[52] U.S. Cl. ........................... 395/750; 326/80; 395/282
[58] Field of Search .................................. 395/750, 282; 326/80

[56] References Cited

U.S. PATENT DOCUMENTS 5,440,244  8/1995  Richter et al. ........................ 326/37
5,594,360  1/1997  Wojciechowski ...................... 324/771

*Primary Examiner*—Jack B. Harvey
*Assistant Examiner*—David A. Wiley

[57] ABSTRACT

Method and apparatus for providing operating system independent support for mixed voltage devices, particularly PC card controllers. In one aspect of the invention, a system management mode ("SMM") of the processor of a PC is used to detect the proper voltage of a PC card inserted in a PC card slot and then to set the voltage level of the PC card controller appropriately. In one embodiment, SMM is entered responsive to detection that the operating system is setting up the registers of the PC card controller by writes to a particular I/O address. In another embodiment, SMM is entered responsive to detection of insertion of a PC card into a PC card slot. In any event, because SMM is operating system independent, the mixed voltage capability of the PC card controller will be supported regardless of whether the operating system installed on the PC supports such functionality.

33 Claims, 2 Drawing Sheets

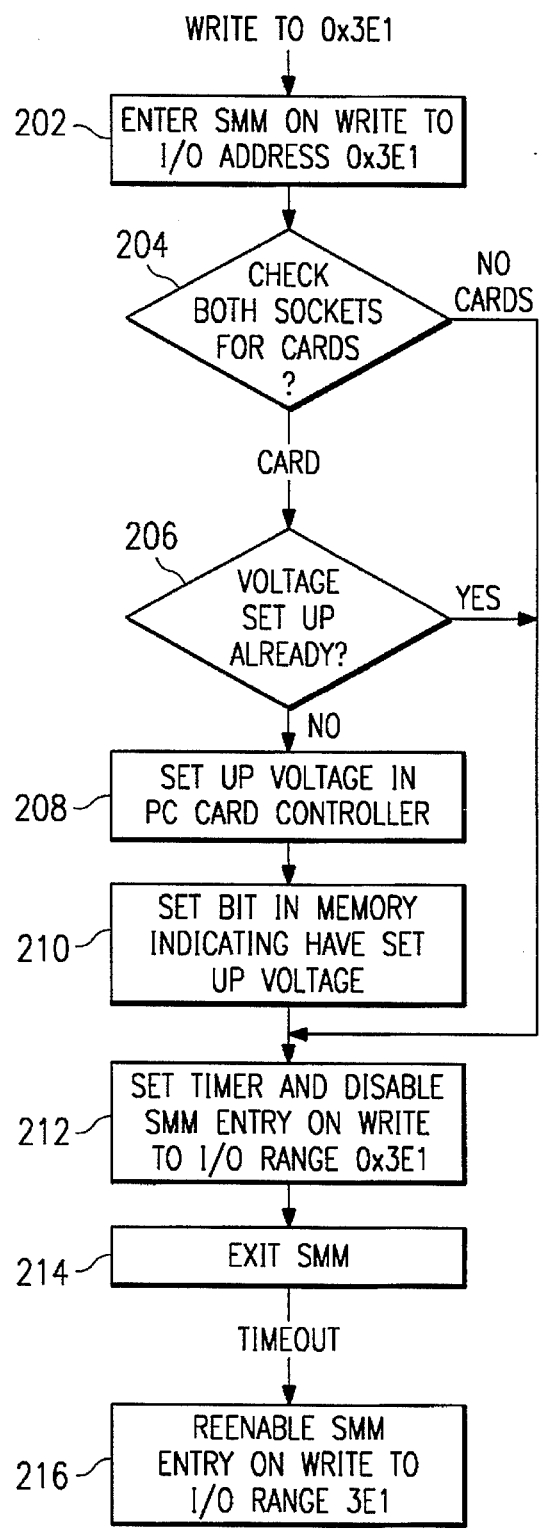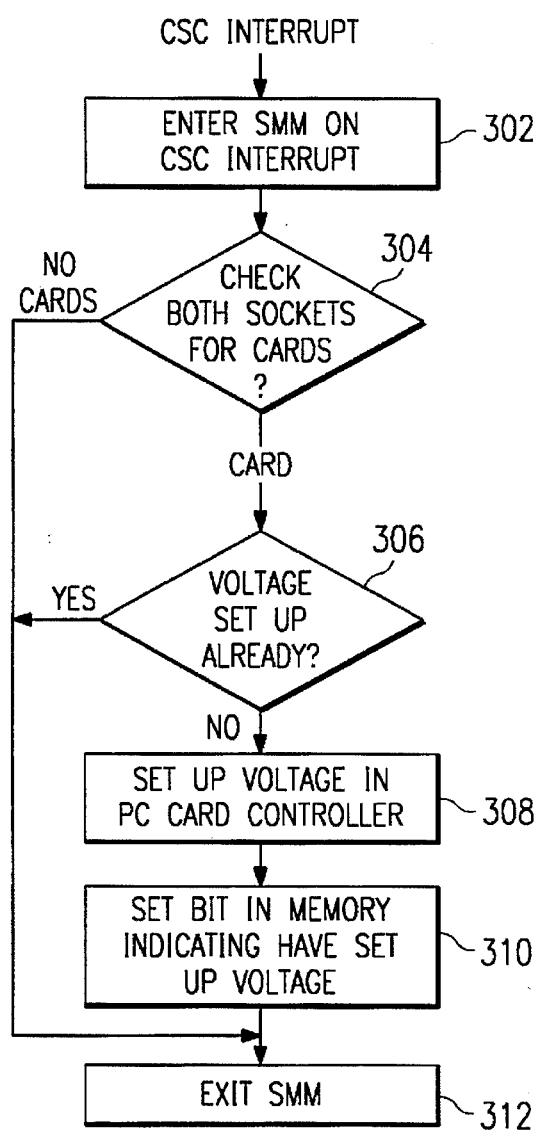

OPERATING SYSTEM INDEPENDENT SUPPORT FOR MIXED VOLTAGE DEVICES

TECHNICAL FIELD

The invention relates generally to mixed voltage devices and, more particularly, to operating system independent support for such devices.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs that can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, although for reasons other than maximizing battery life, it has become desirable to more efficiently manage power consumption of desktop PCs in order to minimize overall operating costs.

One way to reduce the power consumption of a PC is to implement certain PC components as mixed voltage devices that are capable of operating at 5 volts, 3.3 volts, or some other as yet unspecified reduced voltage level. An example of such a mixed voltage device is the Vadem VG-469 ("VG-469") PC card controller, commercially available from Vadem Corporation of San Jose, Calif. A key feature of the VG-469 is that it allows PC cards to run in 5- and 3.3-volt, as well as future lower voltage, systems. In order to safely implement this feature, the VG-469 has a proprietary hardware mechanism that protects lower voltage cards from damage when used in 5-volt systems. Specifically, the VG-469 is designed such that it resets to 3.3 volts. Consequently, in order for it to recognize 5-volt cards, it must be set back to 5 volts. While this feature does indeed protect 3.3-volt cards from damage due to high voltage levels, in view of the fact that the vast majority of PC cards currently available operate at 5, rather than 3.3, volts, some means must be provided for recognizing 5-volt cards and setting the VG-469 accordingly.

In a DOS environment, such recognizing and setting functions are performed by a driver that checks the voltage level of a PC card inserted into a PC card slot and then sets the VG-469 accordingly. However, in the presence of operating systems ("OSs") such as Windows 95, Windows NT, OS/2 and others, that have embedded drivers, and therefore ignore the DOS drivers, such a mixed voltage feature is not presently supported. Hence, when a secure OS such as those previously listed starts up, the VG-469 will reset to 3.3 volts and, because the OS does not support mixed voltage technology, only 3.3-volt cards will be recognized and operable. As a result, users will be able to use their 5-volt cards under DOS, but not under secure OSs, which are becoming increasingly popular.

Therefore, what is needed is an OS-independent mechanism for handling advances in hardware technology, such as mixed voltage devices, that are not supported by the OS of the computer in which such technology is implemented.

SUMMARY OF THE INVENTION

The present invention, accordingly, provides a method and an apparatus that overcome or reduce disadvantages and limitations associated with prior methods and apparatuses with respect to support of mixed voltage devices, particularly PC card controllers.

In accordance with the features of the present invention, a system management mode ("SMM") of the processor of a PC is used to detect the proper voltage of a PC card inserted in a PC card slot and then to set the voltage level of the PC card controller appropriately. In one embodiment, SMM is entered responsive to detection that the OS is setting up the registers of the PC card controller by writes to a particular I/O address. In another embodiment, SMM is entered responsive to detection of insertion of a PC card into a PC card slot via an interrupt. In any event, because SMM is OS-independent, the mixed voltage capability of the PC card controller will be supported regardless of whether the OS installed on the PC supports such functionality.

A technical advantage achieved with the invention is that it enables mixed voltage devices to be supported in an OS-independent manner, such that such technology may be advantageously implemented in PCs having secure OSs.

A more general technical advantage achieved with the invention is that it enables advances in hardware technology that outpaces OS support for such advances to be handled in an OS-independent manner.

BRIEF DESCRIPTION OF THE DRAWINGS

FIG. 2 is a flowchart of the method of the present invention for providing OS-independent support of mixed voltage devices.

FIG. 3 is a flowchart of an alternative method of the present invention for providing OS-independent support of mixed voltage devices.

DESCRIPTION OF THE PREFERRED EMBODIMENT

Figure 1:
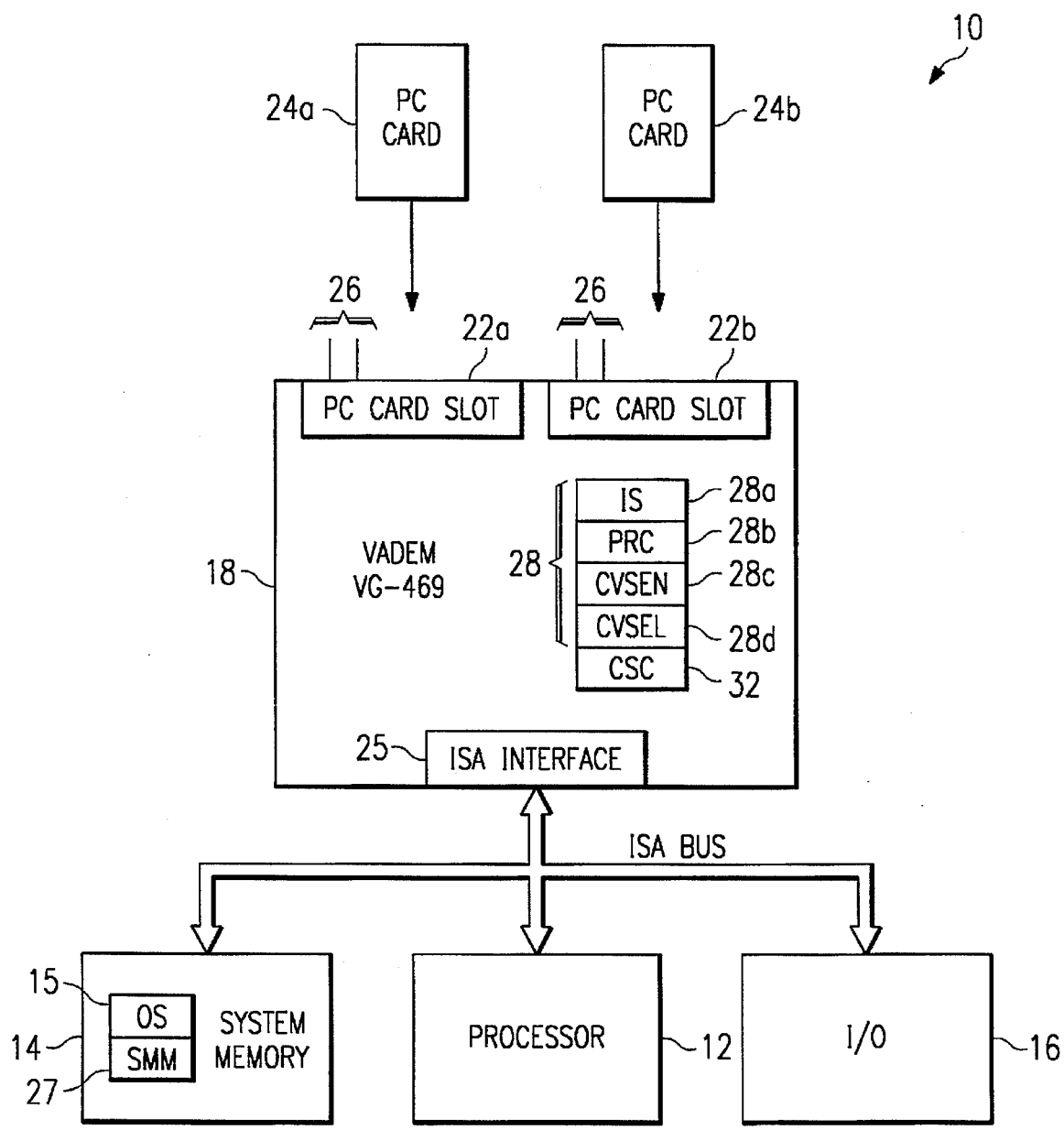
FIG. 1 is a system block diagram of a personal computer (PC) embodying features of the present invention.

FIG. 1 is a system block diagram of a personal computer ("PC") 10 embodying features of the present invention. As shown in FIG. 1, the PC 10 comprises a processor 12, system memory 14, in which is stored a secure operating system ("OS") 15 for execution by the processor 12, several I/O devices, collectively designated by a reference numeral 16, and a PC card controller 18, which in the preferred embodiment is a Vadem VG-469 ("VG-469") commercially available from Vadem Corporation, all interconnected via an ISA bus 20. The VG-469 supports two PC card slots 22a, 22b, for respectively receiving two PC cards 24a, 24b. In addition, the VG-469 supports mixed voltage operation, such that its internal logic, the ISA bus interface 25 and each of the two PC card slots 22a, 22b, can be independently operated at 5 volts, 3 volts, or, in the future, some lower voltage level. In this regard, each slot 22a, 22b, comprises two voltage sense pins 26 that sense the voltage to be applied to card inserted therein. The processor 12 is capable of operating in a system management mode ("SMM") in which a set of instructions stored in SMM space 27 are executed. In view of the fact that SMM is well known in the art, the particulars of its operation will not be described in detail herein.

The VG-469 comprises several general setup registers 28, including an Interface Status ("IS") register 28a through which the status of the PC cards, including detection of card insertion into or removal from the slots 24a, 24b, is accessible, a Power and RESETDRV Control ("PRC") register 28b that, when set, applies the appropriate voltage to the PC card(s), a Card Voltage Sense ("CVSEN") register 28c for indicating the voltage to be applied to the cards, as detected via the pins 26, and a Card Voltage Select ("CVSEL") register 28d to which the selected voltage is written, and a Card Status Change ("CSC") Interrupt Configuration register 32 for configuring the CSC interrupt. As will be recognized by those skilled in the art, the registers 28, 32, may be individually accessed by writing the selected register's index to I/O address 0×3E0 and then reading or writing I/O address 0×3E1 respectively to read from or write to the register.

As will be described with reference to FIG. 3, in one embodiment of the invention, the CSC Interrupt Configuration register 32 is configured such that a change in card status (i.e., card insertion or removal) will result in the generation of a CSC interrupt to a System Management Interrupt ("SMI") input (not shown) of the processor 12 in a known manner.

In a mixed voltage implementation, the slots 22a, 22b, are not powered until a card is inserted therein, at which point the state of the pins 26 may be read via the CVSEN register 28c to determine the voltage to be applied to the slot. In a DOS environment, PC card drivers in the BIOS read the pins 26, write the appropriate voltage to the CVSEL register 28d, and then write to the PRC register 28b to apply voltage to the slot 22a, 22b. In contrast, as previously indicated, in a secure OS, such as the OS 15, the PC card drivers are embedded and may not account for mixed voltage, unlike the DOS drivers. As a result, the appropriate voltage is not written to the CVSEL register 28d by the OS and the controller 18, when powering the slots 22a, 22b, writes the value reset on initiation of the CVSEL register 28d, which is 3.3 volts. The present invention, as described below, provides an OS-independent way in which to properly set up the controller 18 to recognize 5-volt, as well as 3.3-volt, cards.

FIG. 2 is a flowchart of the method of the present invention for providing OS-independent support of mixed voltage devices, such as the controller 18. It should be understood that instructions for implementing the method illustrated in FIG. 2 are stored in SMM space 27 of the memory 14 for execution by the processor 12. The method is initiated upon detection of a write to I/O range 0×3E1, indicating that the OS 15 has begun to set up the controller 18. In step 202, a SMI is generated to the processor 12 responsive to the write to I/O range 0×3E1, causing the processor 12 to enter SMM. In step 204, both slots 22a, 22b, are checked to determine whether a PC card has been inserted in either of the slots. Step 204 may be accomplished by checking the IS register 28a. Upon detection of a card in one of the slots 22a, 22b, execution proceeds to step 206, in which a determination is made whether the voltage has been setup for that card by checking whether a bit in memory reserved for that purpose has been set. If not, execution proceeds to step 208, in which the voltage requirement of the PC card is determined by reading the CVSEN register 28c and the voltage is set up in the controller 18 by writing the appropriate voltage to the CVSEL register 28d. It should be apparent that, so long as the OS 15 remains unaware of the mixed voltage capability of the controller 18, the setting of the CVSEL register in step 208 will remain undisturbed until the controller 18 is reset, typically upon reinitialization of the OS 15. In step 210, the bit checked in step 206 is set to indicate that the voltage has already been setup for each slot 22a, 22b.

Upon completion of step 210, or if in step 204 no cards were detected or in step 206 the voltage has already been set up, execution proceeds to step 212. In step 212, a watchdog timer (not shown) is set to a predetermined time, for example, 0.25 seconds, and SMM entry on writes to I/O address 0×3E1 is disabled. The purpose of step 212 is to prevent the steps 202–210 from being executed while the OS 15 completes setup of the controller 18. In this regard, 0.25 seconds was selected as an appropriate value to allow the OS 15 sufficient time to set up the controller 18, while not permitting a change in card status (i.e., insertion or removal) to go undetected. In step 214, SMM is exited. Upon timeout of the watchdog timer, execution proceeds to step 216, in which SMM entry on writes to I/O address 0'3E1 is reenabled, at which point, subsequent writes to I/O address 0×3E1 are awaited.

FIG. 3 illustrates an alternative embodiment of the method shown in FIG. 2. In particular, whereas, in the method shown in FIG. 2, entry into SMM is triggered by a write to I/O address 0×3E1, in the method shown in FIG. 3, it is triggered by a CSC interrupt, which is directly input to an SMI input of the processor 12. Receipt by the processor 12 of a CSC interrupt begins the process. In 302, the processor enters SMM responsive to receipt of a CSC interrupt. In step 304, both slots are checked for cards. If in step 304, a card is detected in either slot, execution proceeds to step 306, in which a determination is made whether the voltage has already been set up for the card. As previously indicated, this may be determined by checking whether a reserved memory bit has been set. If in step 306 it is determined that the voltage has not already been set up, execution proceeds to step 308, in which the voltage requirement of the PC card is determined by reading the CVSEN register 28c and the voltage is set up in the controller 18 by writing to the CVSEL register 28d, and then to step 310, in which the reserved memory bit is set to indicate that the voltage has been set up. Upon completion of step 310, or if in step 304 no cards were detected or in step 306 the voltage had already been set up, execution proceeds to step 312, in which SMM is exited, at which point subsequent CSC interrupts are awaited. It will be apparent that use of a watchdog timer is unnecessary in this embodiment, as SMM is triggered only by installation of a card, rather than by accesses to the registers 28, 32, of the controller 18.

In this manner, support may be provided for mixed voltage devices in an OS-independent manner, in particular, through use of SMM during OS setup of the device to properly set the voltage thereof.

It is understood that the present invention can take many forms and embodiments. The embodiments shown herein are intended to illustrate rather than to limit the invention, it being appreciated that variations may be made without departing from the spirit of the scope of the invention. For example, the technique described herein could be applied in all situations in which hardware capability outpaces OS support. In addition, the technique may be set to trap on read accesses, rather than write accesses, to the designated I/O address range.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a processor electrically connected to a device capable of operation at more than one voltage level, a method of providing operating system independent support for said device, the method comprising:

causing said processor to enter system management mode ("SMM");

detecting a voltage requirement for said device;

setting a voltage level of said device to said detected voltage requirement; and causing said processor to exit SMM.

2. The method of claim 1 further comprising, prior to said detecting, determining whether said device voltage level has already been set.

3. The method of claim 1 further comprising, subsequent to said setting, providing an indication that said voltage level of said device has been set.

4. The method of claim 1 further comprising, subsequent to said setting, disabling performance of said causing said processor to enter SMM for a predetermined period of time.

5. The method of claim 4 wherein said disabling comprises:

setting a watchdog timer; and disabling performance of said causing said processor to enter SMM until timeout of said timer.

6. The method of claim 5 further comprising, responsive to timeout of said timer, reenabling said causing said processor to enter said SMM.

7. The method of claim 1 wherein said device is a PC card controller comprising at least one slot for receiving a PC card.

8. The method of claim 7 wherein said causing said processor to enter said SMM occurs responsive to insertion of a PC card into said at least one slot.

9. The method of claim 7 wherein said causing said processor to enter said SMM occurs responsive to detection of operating system access to setup registers of said PC card controller.

10. In a computer comprising a processor electrically connected to a mixed voltage device, a method of providing operating system independent support for said mixed voltage device, the method comprising the steps of:

(a) detecting operating system access to setup registers of said mixed voltage device;

(b) responsive to said detecting, causing said processor to enter system management mode ("SMM");

(c) detecting a voltage requirement for said mixed voltage device;

(d) determining whether a voltage level of said mixed voltage device has already been set to said detected voltage requirement;

(e) responsive to a determination that said voltage level of said mixed voltage device has not already been set, setting said voltage level of said mixed voltage device to said detected voltage requirement; and (f) causing said processor to exit SMM.

11. The method of claim 10 further comprising, upon completion of step (e), providing an indication that said voltage level of said mixed voltage device has been set.

12. The method of claim 10 further comprising, upon completion of step (e), disabling performance of step (a) for a predetermined period of time.

13. The method of claim 12 wherein said disabling step comprises:

setting a watchdog timer; and disabling performance of said entering step until timeout of said timer.

14. The method of claim 13 further comprising, responsive to said timeout of said timer, reenabling performance of step (a).

15. The method of claim 10 wherein said mixed voltage device is a PC card controller comprising at least one slot for receiving a PC card.

16. A computer program for providing operating system independent support for a mixed voltage device, the program being stored on a computer-readable medium for execution by a processor electrically connected to said mixed voltage device, the program comprising:

instructions for causing said processor to enter system management mode ("SMM");

instructions for detecting a voltage requirement for said mixed voltage device;

instructions for setting a voltage level of said mixed voltage device to said detected voltage requirement; and instructions for causing said processor to exit SMM.

17. The program of claim 16 further comprising instructions for determining whether said mixed voltage device voltage level has already been set prior to said detecting.

18. The program of claim 16 further comprising instructions for providing an indication that said voltage level of said mixed voltage has been set subsequent to said setting.

19. The program of claim 16 further comprising instructions for disabling performance of said instructions for causing said processor to enter said SMM for a predetermined period of time subsequent to said setting.

20. The program of claim 19 wherein said instructions for disabling comprise:

instructions for setting a watchdog timer; and instructions for disabling performance of said instructions for causing said processor to enter said SMM until timeout of said timer.

21. The program of claim 20 further comprising instructions for reenabling execution of said instructions for causing said processor to enter SMM responsive to said timeout of said timer.

22. The program of claim 16 wherein said mixed voltage device is a PC card controller comprising at least one slot for receiving a PC card.

23. The program of claim 22 wherein execution of said instructions for causing said processor to enter SMM is initiated by insertion of a PC card into said at least one slot.

24. The program of claim 22 wherein execution of said instructions for causing said processor to enter SMM is initiated responsive to detection of operating system access to setup registers of said PC card controller.

25. In a computer comprising a processor electrically connected to a device capable of operation at more than one voltage level, an apparatus for providing operating system independent support for said device, the method comprising:

means for causing said processor to enter system management mode ("SMM");

means for detecting a voltage requirement for said device;

means for setting a voltage level of said device to said detected voltage requirement; and means for causing said processor to exit SMM.

26. The apparatus of claim 25 further comprising means for determining whether said device voltage level has already been set prior to said detecting.

27. The apparatus of claim 25 further comprising means for providing an indication that said voltage level of said device has been set subsequent to said setting.

28. The apparatus of claim 25 further comprising means for disabling performance of said causing said processor to enter SMM for a predetermined period of time subsequent to said setting.

29. The apparatus of claim 28 wherein said means for disabling comprises:

means for setting a watchdog timer; and means for disabling performance of said causing said processor to enter SMM until timeout of said timer.

30. The apparatus of claim 29 further comprising means responsive to timeout of said timer for reenabling said causing said processor to enter said SMM.

31. The apparatus of claim 25 wherein said device is a PC card controller comprising at least one slot for receiving a PC card.

32. The apparatus of claim 31 wherein said means for causing said processor to enter said SMM occurs responsive to insertion of a PC card into said at least one slot.

33. The apparatus of claim 31 wherein said means for causing said processor to enter said SMM occurs responsive to detection of operating system access to setup registers of said PC card controller.

\* \* \* \* \*

UNITED STATES PATENT AND TRADEMARK OFFICE
CERTIFICATE OF CORRECTION

PATENT NO. : 5,634,132
DATED : May 27, 1997
INVENTOR(s) : John J. Pearce & Leslie Thompson It is certified that error appears in the above-identified patent and that said Letters Patent is hereby corrected as shown below:

Column 4, line 11, "0'3E1" should read --0x3E1--

Signed and Sealed this

Fourth Day of November, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.     : 5,634,132
DATED          : May 27, 1997
INVENTOR(S)    : Pearce et al.

It is certified that error appears in the above-identified patent and that said Letters Patent is hereby corrected as shown below:

<u>Title page,</u>
Item [73], Assignee, please insert -- Dell USA, L.P., Austin, Texas --.

Signed and Sealed this

Thirteenth Day of May, 2003

JAMES E. ROGAN
*Director of the United States Patent and Trademark Office*